Patented Oct. 14, 1930

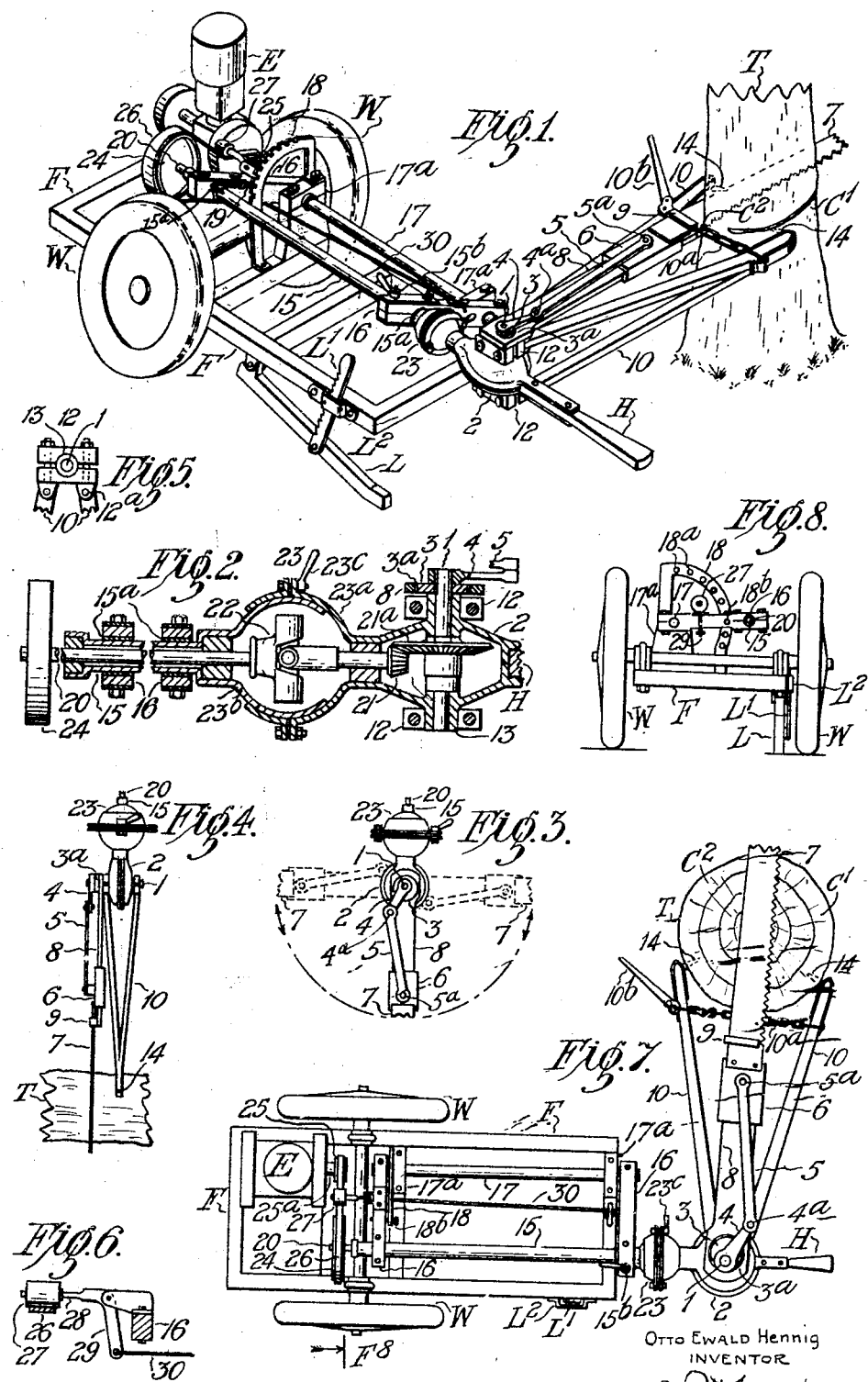
Oct. 14, 1930. O. E. HENNIG 1,778,321
SAWING MACHINE FOR TREE FELLING AND LOG CUTTING
Filed Feb. 25, 1928

1,778,321

UNITED STATES PATENT OFFICE

OTTO EWALD HENNIG, OF JOANNA, AUSTRALIA

SAWING MACHINE FOR TREE FELLING AND LOG CUTTING

Application filed February 25, 1928, Serial No. 257,005, and in Australia March 1, 1927.

One object of this invention is to provide a power operated saw which is adjustable so that it will work in any desired position so as to fell trees—without needing the assistance of an axe, the machine ground wheels not needing to be packed up or otherwise supported at different heights according to the saw position required. The complete adjustability of position of the saw facilitates tree felling and also the lopping of limbs from the fallen tree, and the cutting of trunks by means of vertical, horizontal, or inclined cuts at will.

Another object of the invention is to provide improvements in the mechanism for actuating and guiding the saw so that it will swing, rock, or tilt while being reciprocated, and thus clear itself of cuttings satisfactorily, and work to better effect.

A further object is to provide improved means for gripping the object to be sawed.

I illustrate an embodiment of my invention, but various parts shown can be modified within the scope of the appended claims.

In the drawings, in which the scales vary, Figure 1 is a perspective view of my machine at work felling a tree, making a back cut. Any cut may be horizontal or oblique according to the adjustment of the mechanism.

Figure 2 shows, in vertical section, a driving means, universal joint, bevel gear, and an eccentric to which is connected a guide to align the saw strokes.

Figure 3 is a plan, showing, diagrammatically, the saw and some adjacent parts, dotted lines showing different positions adoptable.

Figure 4 is a plan showing parts of Figure 3 with the saw in a different position.

Figure 5 is a plan showing spike arm supports.

Figure 6 is a sectional diagram of jockey pulley actuating means.

Figure 7 is a plan of the parts in Figure 1.

Figure 8 is a transverse section on line $F^8$ of Figure 7.

In Figure 1 the tree is supposed to have been already given a front cut $C^1$, the back cut $C^2$ being in progress. The wheels W supporting the rear of the machine frame may have resilient tires. Adjustment of a leg L raises or lowers that end of the machine which carries the saw, frame F pivoting on the axle of wheels W when required. A saw operating shaft 1 extends through a rotatably adjustable housing 2, which at will is also angularly adjustable, by means of its universal joint 23. This shaft carries, outwardly of the housing, an eccentric 3 and a crank arm 4 which is connected by a pin $4^a$, rod 5, and pivot $5^a$, to a reciprocating slide 6 which is the carrier of any suitable saw 7. This carrier is mounted slidably on a guide member shown as a bar 8, one end of which is carried by the eccentric, an intermediate strap $3^a$ being shown within the bar end. The bar at its other end carries, for steadying the saw blade, a suitable member shown as a U shaped attachment 9, through the channel of which the saw slides. Not only does the saw,—under the action of crank 4 and parts 5, 6,—reciprocate,—it is rocked, swung, or tilted at intervals by reason of the action of the eccentric on guide bar 8.

The effect is that the saw teeth discharge their cuttings more freely than usual, and at each new stroke attack the wood with better effect.

I provide spike carrying pairs of converging arms 10, extending from pairs of clamps 12, which are mounted on and move with, but are adjustable relatively to, the housing 2. There are any suitable spikes 14, engageable with the tree, log, or other object T to be sawn.

I show two pairs of arms 10 connected by transverse chains $10^a$ having means to cause the chains to draw the arms towards one another to press the spikes into the object being sawn. The means shown is a lever $10^b$ which has a cam surface abutting the arm 10 and having a hole through which one end of chain $10^a$ passes, whereby when the lever is moved, the arms 10 are drawn together or released depending upon the direction in which the lever is moved. The rear end of each arm 10 is pivoted, see Figure 5, at $12^a$ to a clamp 12 which embraces part, such as a boss 13, of housing 2. Loosening of the clamps is effected to permit of rotation of each clamp to adjust it in order that its position and thus the position of the arms 10 will suit the position in which the saw is set. The details of housing 2 can obviously vary, and preferably it is closed as shown, rather than of skeleton form. The housing is preferably integral with part 23ª of the universal joint 23 one part of which 23ᵇ constitutes one end of a rotatably adjustable member 15, preferably tubular, having bearings 15ᵃ on end supports, shown as transverse bars 16, having clamp 15ᵇ, by which member 15 is fixed after adjustment from time to time. Shaft 1 is transverse to a drive shaft 20, which extends through tubular member 15, and by any suitable toothed gears, 21, 21ᵃ, imparts rotation to shaft 1. This drive shaft has a universal joint 22 within the universal joint 23 to allow of further variously locating shaft 1 to work the saw in any desired position.

Various forms of universal joint are suitable, an outer member 23ᵃ being shown enclosing part of the aforesaid part 23ᵇ, a clamp 23ᶜ being provided, see Figure 2, to fix the parts where adjusted.

The supports 16 of member 15 project from a rotatable axle 17 which is supported by bearings 17ᵃ on the machine frame. To hold arms 16 firmly in adjusted position, there is,—see Figure 8,—a bar or quadrant 18 having notches, or holes 18ᵃ, any selected one of which is engaged by a locking member shown in Figure 8 as a pin 18ᵇ, and in Figure 1 as a tooth 19.

If the power of height adjustment of member 15 be not desired, the construction would obviously be simplified by putting bearings 15ᵃ on frame F.

To permit of adjustment of the height of the frame when the saw is about to be worked, the fore end of the machine frame has means of support, illustrated by an adjustable leg L, and stay bar L¹ which engages a holder L².

Any suitable handle H is provided to facilitate movement of the machine, and is located at any convenient part of the frame.

When the saw is—see Figure 3—in alignment with drive shaft 20 the clamps of housing 2 may be loosened and the housing rotated about the axis of that shaft, to set the saw teeth to face in any desired direction. The saw position can be still further adjusted, however, to put its blade in any desired cutting position.

The shaft driving means include speed reduction gear, for example shaft 20 carries—see Figures 1 and 7—a pulley 24 rotated by a belt 26 extending from a pulley 25 on the shaft 25ᵃ of the engine E mounted on the machine frame.

A jockey pulley 27 is on a bell crank arm 28 the other arm 29 having any suitable control member, such as a cord 30 extending to any suitable grip. When belt 26 is slack, movement is not transmitted from the engine to shaft 20, but when the jockey pulley is made to tighten belt 26 the drive is transmitted to shaft 20.

I claim:—

1. In a sawing machine, in combination, a frame, a shaft rotatably mounted on said frame, a second shaft fixed to said first mentioned shaft by cross arms, power transmission means on one end of said second mentioned shaft, a reciprocating saw on the other end of said second mentioned shaft, and means to hold said second mentioned shaft at any desired distance from said frame within predetermined limits.

2. In a sawing machine, in combination, a frame, a shaft journaled in said frame, a second shaft fixed to said first shaft by cross arms, power transmission means on one end of said second mentioned shaft, a universal joint on the other end of said second mentioned shaft, a reciprocating saw mounted closely adjacent said universal joint on said second mentioned shaft, and means to hold said second mentioned shaft at any desired distance from said frame within predetermined limits.

OTTO E. HENNIG.